United States Patent [19]

Dennison

[11] 3,935,077

[45] Jan. 27, 1976

[54] AUTOMATIC WATER DISTILLER

[76] Inventor: Clifford C. Dennison, 440 Centenary Ave., Cleveland, Tenn. 37311

[22] Filed: Apr. 29, 1974

[21] Appl. No.: 464,831

[52] U.S. Cl. .................. 202/83; 202/180; 202/193; 203/1; 203/10
[51] Int. Cl.² ...................... B01D 3/00; C02B 1/08
[58] Field of Search ............ 202/83, 177, 180, 187, 202/190–193

[56] References Cited
UNITED STATES PATENTS

| | | | |
|---|---|---|---|
| 799,002 | 9/1905 | Hodges et al. | 202/177 |
| 2,254,538 | 9/1941 | Newman | 202/193 |
| 3,689,367 | 9/1972 | Kassat et al. | 202/190 |
| 3,838,016 | 9/1974 | Powers | 202/187 |

Primary Examiner—Wilbur L. Bascomb, Jr.
Assistant Examiner—Frank Sever

[57] ABSTRACT

An automatic water distiller has an insulated evaporator to which water is supplied after being preheated by cooling the steam, which is produced by the evaporator, in a condensing chamber with which the water is in heat exchange relation. Air also flows in heat exchange relation with the condensing chamber to aid in condensing the steam. A storage chamber is disposed above the evaporator and beneath the condensing chamber to receive the condensed steam and the air, which flows over the condensing chamber to cool the steam therein, is first passed in heat exchange relation with the distilled water in the storage chamber. The vapors in the condensing chamber are vented to the chamber in which the water is in heat exchange relation with the condensing chamber.

6 Claims, 4 Drawing Figures

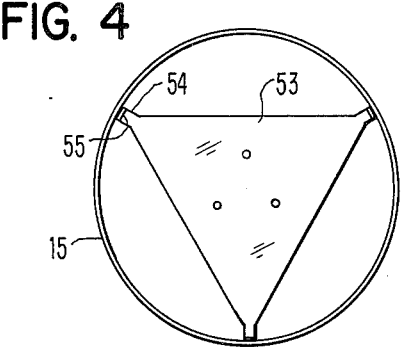
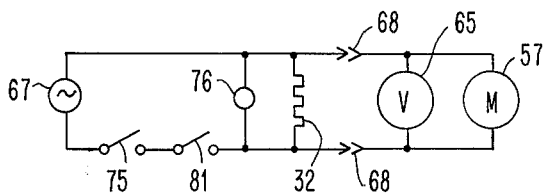
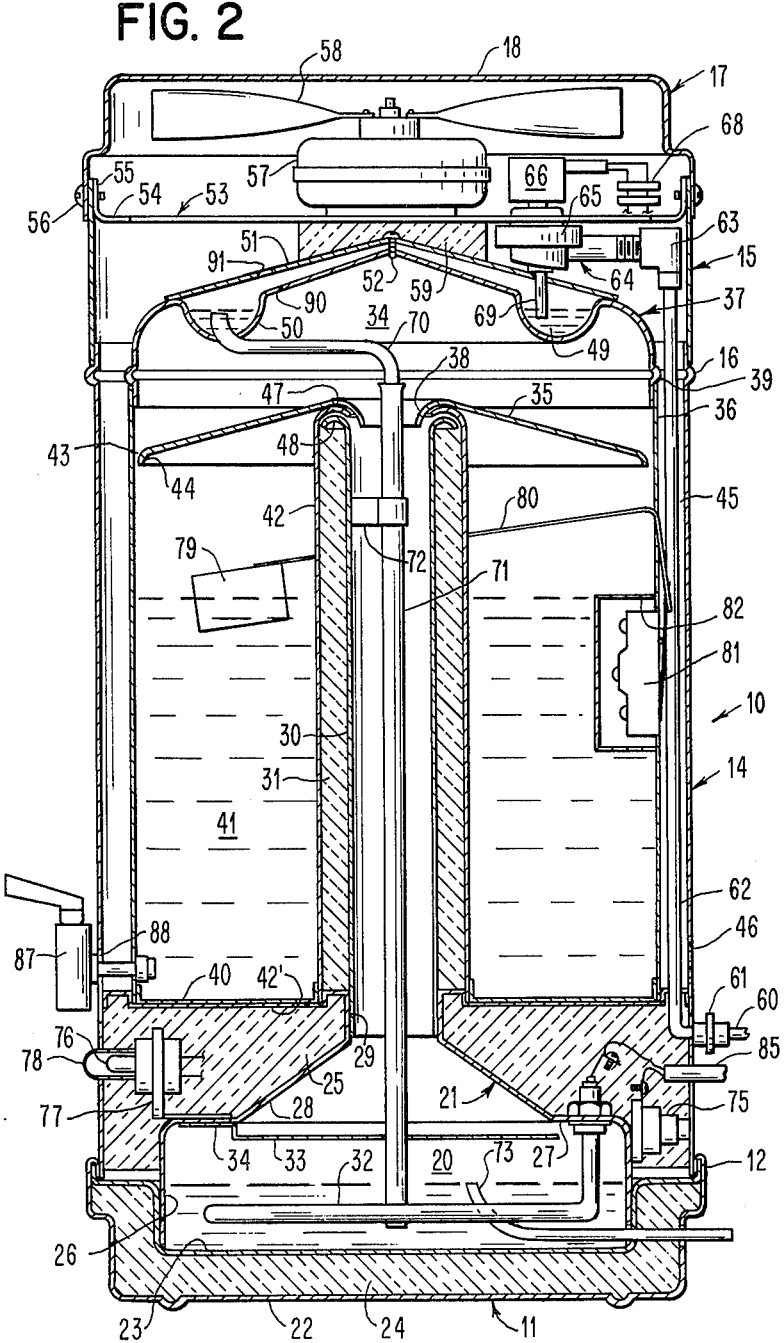

AUTOMATIC WATER DISTILLER

The sources of drinking water contain various elements, which can cause health hazards. This is because many toxic chemicals, for example, which are currently used by American industry, find their way into the various water supplies. Thus, many of the water supply systems in the United States fail to meet the present U.S. Public Health Service drinking standards.

While various types of bottled water are sold for drinking purposes, many also fail to meet the standards of the U.S. Public Health Service for drinking water. Thus, safe drinking water is not necessarily obtainable through purchase of the water, either from a water system or bottled water.

One satisfactory way of achieving safe drinking water is to produce distilled water. This removes all of the undesired elements from the water such as inorganic materials and toxic chemicals, for example.

The present invention satisfactorily solves the foregoing problems through providing an automatic water distillation apparatus designed primarily for domestic use although it can be employed for commercial use. The distillation apparatus of the present invention requires the user to only remove the distilled water when needed and an occasional cleaning. Thus, once the distillation apparatus of the present invention is set up, the user can have all of the desired distilled water.

The present invention is relatively economical to operate through using both air and water to cause condensation of the steam produced by an electrical evaporator of the distillation apparatus of the present invention. The use of air cooling reduces the amount of waste water, which is not utilized in the evaporator, to a minimum. At the same time, by utilizing water to cool the steam prior to supplying it to the evaporator, the present invention reduces the energy required by the evaporator to convert the water to steam since the water is preheated because of its heat exchange with the steam. Thus, the distillation apparatus of the present invention reduces the amount of energy required without wasting a large quantity of water.

An object of this invention is to provide a water distillation apparatus having simultaneous air and water cooling of the condensing chamber.

Another object of this invention is to provide a water distillation apparatus in which there is preheating of the feed water to the evaporator.

A further object of this invention is to provide a water distillation apparatus that can be easily utilized in any portion of a home.

Still another object of this invention is to provide a water distillation apparatus that can be easily disassembled for cleaning and maintenance.

Other objects of this invention will be readily perceived from the following description, claims, and drawings.

This invention relates to a water distillation apparatus including a base having a shell removable supported thereby. Insulated evaporator means is disposed within the shell and the base. A condensing chamber is disposed within the shell above the insulated evaporator means and has steam transported thereto from the insulated evaporator means by insulated means. A water cooling and preheating chamber is disposed above the condensing chamber with the water cooling and preheating chamber having a common wall with the condensing chamber to provide heat exchange therebetween. First means supplies water to the water cooling and preheating chamber to aid in cooling the steam in the condensing chamber. The water in the water cooling and preheating chamber is supplied by second means to the insulated evaporator means when the water in the water cooling and preheating chamber reaches a predetermined level. The condensing chamber has its outer wall spaced from the shell to form a passage therebetween, and means causes the flow of air through the passage to aid in cooling the steam in the condensing chamber. Distilled water produced by condensation of the steam in the condensing chamber is collected from the condensing chamber by suitable means.

The attached drawing illustrates a preferred embodiment of the invention, in which:

FIG. 1 is a perspective view of the water distillation apparatus of the present invention;

FIG. 2 is a vertical sectional view of the water distillation apparatus of FIG. 1;

FIG. 3 is a schematic wiring diagram showing the arrangement for controlling the operation of the water distillation apparatus; and FIG. 4 is a top plan view of the mounting plate disposed within the shell.

Referring to the drawing and particularly FIGS. 1 and 2, there is shown a water distillation apparatus 10 including a base 11 having an upstanding portion 12 within which the lower end of a cylindrically shaped shell 14 is removably supported. A cylindrically shaped shell 15 is removably supported on the upper end of the shell 14 by having its lower end supported on an outwardly extending protrusion or bead 16 of the shell 14. A cap 17 is removably supported on the upper end of the shell 15 and has its upper wall 18 formed with ports 19 or a screen.

An evaporator chamber 20 (see FIG. 2) is formed between the base 11 and an evaporator top 21. The evaporator top 21 has its lower portion supported within the base 11.

The base 11 is formed of a pair of sheet metallic pans or elements 22 and 23, which are secured together by suitable means such as crimping, for example. The crimped ends form the upstanding portion 12. A heat insulation material 24 such as polyurethane foam, for example, is disposed in the space between the pans 22 and 23 of the base 11.

A molded ring 25 of heat insulation material, which preferably is formed of the same material as the heat insulation material 24, is disposed in surrounding relation to the evaporator top 21. Thus, the evaporator chamber 20 is insulated against heat.

The evaporator top 21 has a depending side wall 26 extending into the upper pan 23 of the base 11 to support the evaporator top 21 therein. The upper end of the side wall 26 has a substantially horizontal wall 27 extending inwardly therefrom. An inclined wall 28 extends upwardly from the inner end of the wall 27 and has a substantially vertical wall 29 at its upper end.

The vertical wall 29 has a hollow tube or pipe 30 secured thereto by suitable means such as welding, for example. The hollow tube or pipe 30 is surrounded by a layer 31 of heat insulation material, which preferably is formed of the same material as the molded ring 25.

An electrical heating element 32 is supported by the substantially horizontal wall 27 of the evaporator top 21. Thus, when the evaporator top 21 is removed from its support by the base 11, the electric heating element 32 is carried therewith as is the layer 31 of heat insulation material and the hollow tube 30.

The evaporator chamber 20 has a circular shaped baffle 33, which is supported by the evaporator top 21 through having an integral flange 34 welded to the substantially horizontal wall 27 of the evaporator top 21, disposed beneath the hollow tube 30. The baffle 33 insures that no water droplets escape from the evaporator chamber 20 through the hollow tube 30 but that only steam flows therethrough. Thus, only steam, which has had all the minerals and chemicals distilled therefrom, passes upwardly through the hollow tube 30.

The upper end of the hollow tube 30 communicates with a condensing chamber 34. The condensing chamber 34 is formed by a lower, inclined condensing plate 35, an outer wall 36, and a dome or cover 37.

The annular shaped plate 35 is removably supported by the upper end of the hollow tube 30 through having a flange 38 disposed over the upper end of the hollow tube 30. The dome 37 is removably supported on the upper end of the outer wall 36 by having an outwardly extending protrusion or bead 39 formed adjacent its end to engage the upper end of the outer wall 36.

The outer wall 36 of the condensing chamber 34 is a single wall extending upwardly from a bottom wall 40 of a distilled water storage chamber 41. The storage chamber 41, which is an annular shaped cylinder, includes an inner vertical wall 42 with the plate 35 of the condensing chamber 34 forming the top wall of the storage chamber 41.

A support ring 42' is disposed beneath the bottom wall 40 to which it is secured. The support ring 42' rests on the molded ring 25 of heat insulation material.

The plate 35 terminates prior to the outer wall 36 so that an annular passage 43 is formed between a downwardly depending flange 44 of the plate 35 and the inner surface of the outer wall 36 to allow the condensed steam to flow into the storage chamber 41 from the condensing chamber 34. A longitudinal, annular passage 45, which is formed between the outer wall 36 and the shell 14, communicates at its lower end with air inlet ports 46 in the shell 14.

The upper end of the inner vertical wall 42 of the storage chamber 41 has an inwardly extending annular flange 47 adapted to be disposed in overlapping relation to an outwardly extending annular flange 48 on the upper end of the hollow tube 30. Thus, the hollow tube 30 removably supports the storage chamber 41 since the condensing plate 35 can be removed from the hollow tube 30 as well as the connected inner wall 42, the bottom wall 40, the outer wall 36, and the support ring 42' of the storage chamber 41.

The dome 37 has a water cooling and preheating chamber 49, which is annular shaped, formed therein. A wall 50 of the dome 37 defines the water cooling and preheating chamber 49 and is a common wall with the condensing chamber 34. Thus, cold water, which is supplied to the water cooling and preheating chamber 49, is in heat exchange relation with steam supplied through the supply tube 30 to the condensing chamber 34 to condense the steam.

A cap 51 is removably supported on the dome 37 to close the water cooling and preheating chamber 49. The cap 51 is removably connected to the dome 37 by a screw 52 to prevent any accidental removal of the cap 51.

A mounting plate 53 is disposed above the cap 51. The mounting plate 53 is preferably triangular shaped (see FIG. 4) and has a finger 54 extending from each of the apexes. A flange or bracket 55 extends upwardly from each of the fingers 54 to receive a screw 56, which secures the removable cap 17 and the mounting plate 53 to the shell 15.

The mounting plate 53 has a fan motor 57 supported thereon. A fan 58 is driven by the motor 57 to cause air to flow through the inlet ports 46 into the air passage 45 and through the air passage 45 in heat exchange relation with the entire length of the outer wall 36. As a result, steam in the condensing chamber 34 is cooled by the air after the air has initially cooled any distilled water in the storage chamber 41. The air exits through the ports 19 in the upper wall 18 of the cap 17 after flowing between the mounting plate 53 and the shell 15.

A layer 59 of heat insulation material, which is preferably the same material as the molded ring 25, is supported on the lower side of the mounting plate 53 by suitable means such as adhesive cement, for example. The layer 59 prevents transfer of heat from the fan motor 57 to the water cooling and preheating chamber 49.

Water is supplied to the water cooling and preheating chamber 49 from a source of water by a supply line 60, which is connected to the source of water. The supply line 60 is connected through a coupling 61 with a line 62, which extends upwardly within the passage 45. Thus, by means of the coupling 61, the line 62 can be disconnected from the supply line 60 so that this does not prevent removal of the shell 14 from the base 11 when desired.

The upper end of the line 62 is connected through an elbow 63 with a water flow regulator 64, which is supported on the mounting plate 53 intermediate two of the fingers 54. The water flow regulator 64 controls the quantity of water flowing into the water cooling and preheating chamber 49 regardless of fluctuations in the supply pressure of the water flowing in the water supply line 60.

The flow of water to the water cooling and preheating chamber 49 is controlled by a solenoid valve 65, which is supported adjacent the water regulator 64. The solenoid valve 65 includes a rectifier 66. The fan motor 57 and the solenoid valve 65 are connected to a source of power 67 (see FIG. 3) through a quick disconnect 68. The quick disconnect 68 enables the shell 15 to be removed from the shell 14 and the shell 14 to be removed from the base 11.

When the solenoid valve 65 is opened by energization of its solenoid, water flows into the water cooling and preheating chamber 49 through a tube 69. The water adjacent the wall 50 is in heat exchange with the steam flowing into the condensing chamber 34 from the evaporator chamber 20 to condense the steam.

When the level of the water in the water cooling and preheating chamber 49 is such that water can enter the upper end of a feed water transport tube 70, which is supported in the wall 50 of the chamber 49 by welding, for example, water flows from the water cooling and preheating chamber 49 through the tube 70 into a tube 71, which has the tube 70 slidably disposed therein and is supported by a clamp 72 on the inner surface of the hollow tube 30. The clamp 72 is welded to the inner surface of the hollow tube 30 and holds the tube 71 by a spring clip action.

The tube 71 extends through the baffle 33 into the evaporator chamber 20. The tube 71 is welded to the baffle 33.

Accordingly, whenever the dome 37, which has the water cooling and preheating chamber 49 therein, is removed from support by the outer wall 36, the feed tube 70 merely slides out of the tube 71. The tube 71 is removable with the hollow tube 30 and the evaporator top 21.

The water in the evaporator chamber 20 is maintained at a level defined by the upper end of a waste water discharge tube 73, which extends through the pans 22 and 23 of the base 11. The side wall 26 of the evaporator top 21 has a longitudinal slot extending upwardly from its lower end to receive the waste water discharge tube 73. Thus, the evaporator top 21 can be removed from its support by the base 11 without the waste water discharge tube 73 interfering therewith. When the water exceeds the level at the top of the waste water discharge tube 73, the water in the evaporator chamber 20 flows through the waste water discharge tube 73. Thus, the level of the water in the evaporator chamber 20 is maintained at a predetermined level.

If the supply of water should fail to reach the evaporator chamber 20 for any reason, the electric heating element 32 will rise in temperature above its normal operating temperature and cause the temperature of the evaporator chamber 20 to increase. As a result, the surface of the evaporator top 21 will heat up sufficiently to cause a high temperature manual reset relay 75, which is supported by the evaporator top 21 as shown in FIG. 2, to open.

The opening of the relay 75 disconnects the power source 67. When this occurs, an indicator light 76 is turned off to indicate that the electrical system for the distillation apparatus 10 is no longer energized. As a result, the user must activate the reset relay 75 manually to activate the electrical system; this will remind the user to correct for any malfunction of the supply of water since it is the absence of the water in the evaporator chamber 20 that caused the relay 75 to be opened.

The indicator light 76 is supported on a bracket 77, which is welded to the substantially horizontal wall 27 of the evaporator top 21. The indicator light 76 is viewable through a reflector 78, which is supported in a hole in the shell 14.

When the distilled water within the storage chamber 41 rises upwardly to a predetermined level, a float 79 is moved upwardly. The float 79 is carried at one end of a rod 80, which cooperates with a switch 81 to open the switch 81 when the distilled water in the storage chamber 41 reaches the predetermined level. The opening of the switch 81, which is disposed within a recess 82 in the outer wall 36 of the storage chamber 41, disconnects the heating element 32, the solenoid valve 65, and the fan motor 57 from the power source 67 to inactivate them.

The power source 67 is connected to the various elements of the water distillation apparatus 10 through a power cord 85. The cord 85 passes through a longitudinally extending slot 86, which extends upwardly from the bottom end of the shell 14. The slot 86 also accomodates the push button of the manual reset relay 75. Accordingly, the shell 14 can be removed from the base 11 without interference of the power cord 85.

The bottom of the outer wall 36 of the storage chamber 41 has a faucet 87 fastened thereto and extending through an elongated slot 88 in the shell 14. The slot 88 extends upwardly from the bottom end of the shell 14. A cover closes most of the slot 88. When it is desired to remove distilled water from the storage chamber 41, it is only necessary to open the faucet 87. Because of the slot 88, the shell 14 can be moved vertically relative to the storage chamber 41. Thus, the faucet 87 does not interfere with removal of the shell 14 from the base 11.

Considering the operation of the water distillation apparatus 10, the connection of the cord 85 with the power source 67 supplies electricity from the power source 67. If the manual reset relay 75 is closed and the switch 81 for the float 79 is closed because the level of the water in the storage chamber 41 is not at the predetermined level, then the heating element 32 is energized, the solenoid valve 65 is opened, and the fan motor 57 is activated.

Thus, water is supplied to the water cooling and preheating chamber 49 from which it flows through the tubes 70 and 71 to the evaporator chamber 20. In the evaporator chamber 20, the water, which has been preheated through heat exchange relation with the steam in the condensing chamber 34, is evaporated by the electric heating element 32 to form steam, which flows through the hollow tube 30 to the condensing chamber 34. In the condensing chamber 34, the steam is condensed, and the water flows from the condensing chamber 34 through the annular passage 43 into the storage chamber 41.

The fan 58 draws air through the ports 46 in the shell 14 and through the passage 45 to cool the distilled water in the storage chamber 41 and to aid in condensing the steam in the condensing chamber 34. Any water flowing from the water cooling and preheating chamber 49 beyond that required in the evaporator chamber 20 escapes through the waste water discharge tube 73.

Water distillation continues until the level of the distilled water in the storage chamber 41 reaches that at which the float 79 moves upwardly to open the switch 81. This disconnects the power source 67 from the solenoid valve 65 to stop the flow of water to the water cooling and preheating chamber 49, from the fan motor 58 to stop the flow of air through the passage 45, and from the heating element 32 to stop formation of steam in the evaporator chamber 20. The water distillation apparatus 10 remains inactive until some of the distilled water is removed from the storage chamber 41 through opening the faucet 87. When this occurs, the switch 81 will again close and distillation of the water will start again.

Volatile gases such as carbon dioxide, chlorine, and ammonia, which may be in the steam, are vented from the condensing chamber 34 through one or more vent openings 90 in the dome 37. The gases are collected in the upper end of the water cooling and preheating chamber 49 from which they flow through one or more vent openings 91 in the cap 51.

If the water supply should be inadvertently stopped, the manual reset relay 75 opens because of the increased heat generated in the evaporator chamber 20 due to the lack of water therein. Thus, this prevents any inadvertent overheating of the water distillation apparatus 10.

Whenever it is necessary to clean the water distillation apparatus 10, particularly the evaporator chamber 20, the evaporator base 11, together with pan 23 and insulation 23, can be removed as a unit. The rest of the apparatus will be left intact and need not be dissembled except on rare occasions for cleaning. Residues will be kept in suspension by the agitation of boiling water and will be continually flushed down the drain by overflowing through drain pipe 73. Therefore, residues will not normally collect on bottom of chamber 20.

It should be understood that the shells 14 and 15 of the water distillation apparatus 10 can be formed of metal or plastic. The shells 14 and 15 can be finished in any appliance color such as avocado or harvest gold, for example. The base 11 of the water distillation apparatus 10 would be finished in chrome plate, for example, or any other finish that would esthetically harmonize with the color of the shells. Similarly, the cap 17 of the water distillation apparatus 10 would be finished similar to the base 11.

A very important advantage of this distillation apparatus, due to its construction, is that it can be vented and, hence, can be built into a cabinet or an enclosed space. Venting discharges the heat and the volatile gases, such as chlorine, to the outside. Under certain conditions of operation, heat generated in the process of distillation can cause problems for the user and, in previously known equipment, chlorine gas may become toxic to certain individuals if allowed to accumulate in the room.

Another advantage of this invention is that a water distillation apparatus can be readily disposed in a home. Still another advantage is that it can be easily disassembled for cleaning and maintenance. A further advantage of this invention is that it reduces the amount of water required through using both air and water cooling of the steam condensing chamber. Still another advantage of this invention is that it reduces the energy required to heat the water in the evaporator to vaporize it because of preheating the feed water to the evaporator.

For purposes of exemplification, a particular embodiment of the invention has been shown and described according to the best present understanding thereof. However, it will be apparent that changes and modifications in the arrangement and construction of the parts thereof may be resorted to without departing from the spirit & scope of the invention.

I claim:

1. A water distillation apparatus including:
a base;
a shell removably supported by said base;
insulated evaporator means disposed within said shell and said base;
a condensing chamber disposed within said shell above said insulated evaporator means;
insulated means to transport steam from said insulated evaporator means to said condensing chamber;
a water cooling and preheating chamber disposed above said condensing chamber, said water cooling and preheating chamber having a common wall with said condensing chamber to provide heat exchange therebetween;
first means to supply water to said water cooling and preheating chamber to aid in cooling the steam in said condensing chamber;
second means to supply the water in said water cooling and preheating chamber to said insulated evaporator means when the water in said water cooling and preheating chamber reaches a predetermined level;
said condensing chamber having its outer wall spaced from said shell to form a passage therebetween;
means to cause the flow of air through said passage to aid in cooling the steam in said condensing chamber;
means to inactivate said first water supply means, said insulated evaporator means, and said causing means when the water in said storage chamber reaches a predetermined level;
a storage chamber disposed within said shell above said insulated evaporator means and beneath said condensing chamber, for storing the distilled water from said condensing chamber produced by condensation of the steam in said condensing chamber;
said insulated means to transport steam extending through said storage chamber and being insulated therefrom;
an annular plate mounted at its inner circumference on said insulated means to transport steam, separating said condensing chamber from said storage chamber, with its outer circumference spaced from said outer wall of said condensing chamber, for directing a portion of the steam from said condensing chamber into said storage chamber.

2. The distillation apparatus according to claim 1 in which said causing means includes:
a fan supported above said water cooling and preheating chamber and communicating with said passage;
and means in said shell and communicating with said passage to allow air to enter said passage.

3. The distillation apparatus according to claim 1 in which said first water supply means includes:
first means supported by said shell and connected to a source of water;
and second means to control the flow of water from the source through said first means to said water cooling and preheating chamber.

4. The distillation apparatus according to claim 1 including means to control the level of water within said insulated evaporator means.

5. The distillation apparatus according to claim 1 including means to inactivate said insulated evaporator means when the water therein falls below a predetermined level.

6. The distillation apparatus according to claim 1 including means to vent vapors from said condensing chamber.

* * * * *